T. G. RICE.
Animal-Trap.

No. 215,480. Patented May 20, 1879.

Witnesses
Charles G. Simpson
W. E. Fudger

Inventor
Thos. G. Rice

UNITED STATES PATENT OFFICE

THOMAS G. RICE, OF MONTREAL, QUEBEC, CANADA, ASSIGNOR TO RICHARD WILLIAM COWAN, OF SAME PLACE.

IMPROVEMENT IN ANIMAL-TRAPS.

Specification forming part of Letters Patent No. 215,480, dated May 20, 1879; application filed December 16, 1878.

*To all whom it may concern:*

Be it known that I, THOMAS GEORGE RICE, of the city and district of Montreal, Province of Quebec, Canada, have invented certain new and useful Improvements in Animal-Traps; and I do hereby declare that the following is a full, clear, and exact description of the same.

This invention has reference most particularly to a double-ended pawl arranged to hold the trap open until the catch is removed from the pawl. This pawl enables the trap to be set and go off with ease, whereas in the constructions of the class to which my invention relates, at present in use, if the trap is made to go off with ease it is very difficult to set, and will often go off by itself a short time after being so set. If the catch is arranged to set easy the friction of the parts is so great that the bait is often taken by the animal without the trap going off, in which case it is useless.

Figure 1:
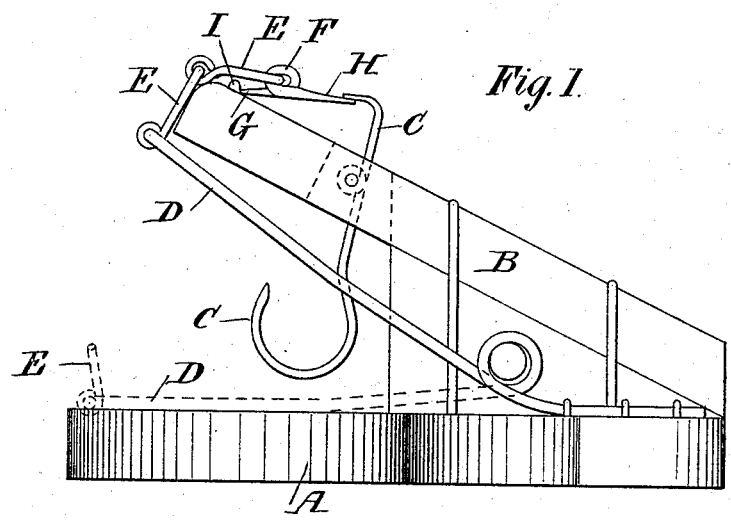
Figure 2:
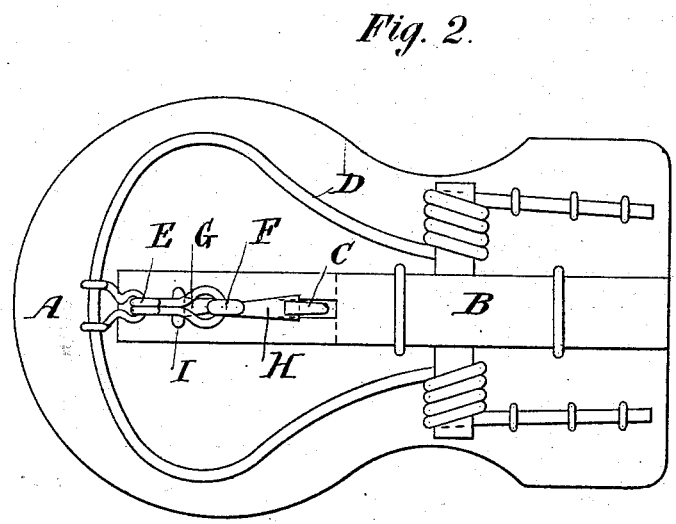

In the drawings hereunto annexed, similar letters of reference indicate like parts, and Figure 1 is a side elevation of a trap embodying my invention. Fig. 2 is a plan of Fig. 1.

Letter A is the base; B, the post for holding the catch and hook C. D is the catching-spring. Thus far the construction may be said to be substantially as heretofore in use.

To the spring D, by links E, is attached a pawl, F, provided with an eye, into which E is fastened.

In the post B a broad flat projection, I, is driven for the front end, G, of the pawl to catch against, while the other end of the pawl is caught by the upper end of C.

It will be observed that the end G of F is very much shorter than the end H. This gives C considerable leverage for holding down the pawl; but were the ends made equal C would still have considerable leverage to hold the pawl.

It will also be seen that, from the position of the pawl and the direction in which the upper link, E, strains upon it, very little power of C is required to hold the pawl, so that less friction is required to move the end of C off the end H, and the end H being broad the trap is easy to be set.

Instead of D being a spring it may be a door, and the same result be attained.

What I claim, and wish to secure by Letters Patent, is as follows:

The combination of the spring D, having pawl F attached thereto, as described, post B, having the projection I, and catch C, substantially as and for the purposes set forth.

THOS. G. RICE.

Witnesses:
 CHARLES G. C. SIMPSON,
 W. E. FUDGER.